United States Patent [19]

Kucsma

[11] 3,883,473

[45] May 13, 1975

[54] GLASS FIBER REINFORCED POLYVINYL CHLORIDE

[75] Inventor: Michael E. Kucsma, Baton Rouge, La.

[73] Assignee: Ethyl Corporation, Richmond, Va.

[22] Filed: Aug. 3, 1973

[21] Appl. No.: 385,412

Related U.S. Application Data

[63] Continuation-in-part of Ser. No. 181,625, Sept. 17, 1971, abandoned, which is a continuation-in-part of Ser. No. 828,720, May 28, 1969, abandoned.

[52] U.S. Cl............................. 260/42.18; 260/829
[51] Int. Cl.² ......................................... C08F 45/10
[58] Field of Search...................... 260/829, 42.18

[56] References Cited
UNITED STATES PATENTS 2,773,851   12/1956   Tolman .............................. 260/829
3,022,210   2/1962   Philipps ........................... 260/42.18

Primary Examiner—Joseph L. Schofer
Assistant Examiner—Paul R. Michl
Attorney, Agent, or Firm—Donald L. Johnson; John F. Sieberth; David L. Ray

[57] ABSTRACT

A glass fiber reinforced thermoplastic composition particularly suitable for use in forming high strength articles by injection molding. The resin composition includes about 100 parts by weight of a vinyl chloride polymer and from about 8 to about 15 parts by weight of a coumarone-indene resin. The resin glass composition comprises by weight about 5–50 percent glass fiber and about 95–50 percent of the resin composition.

10 Claims, No Drawings

GLASS FIBER REINFORCED POLYVINYL CHLORIDE

CROSS-REFERENCE TO RELATED APPLICATIONS

This application is a continuation-in-part of pending application Ser. No. 181,625, filed Sept. 17, 1971, now abandoned which in turn was a continuation-in-part of application Ser. No. 828,720, filed May 28, 1969, now abandoned.

BACKGROUND OF THE INVENTION

1. Field of the Invention

This invention relates to a glass fiber reinforced polyvinyl chloride composition. More particularly the invention relates to a composition having physical properties and flow characteristics making it highly suitable for use as an injection molding compound.

2. Description of the Prior Art

There has been a greatly increased demand for reinforced thermoplastic materials. Many commercially available thermoplastics such as nylons, polyethylenes, polypropylenes, polyacetals, polycarbonates, polystyrenes, styrene-acrylonitrile copolymers, acrylonitrile-butadiene-styrene copolymers, and others are presently available as molding pellets containing glass fibers. These glass fiber reinforced polymers are finding increased use in injection molding processes to produce a wide variety of structural shapes. The automotive industry in particular is using increasing quantities of injection molded glass fiber reinforced thermoplastic sub-assemblies to replace die-cast, zinc and magnesium components used heretofore. Other large areas of use for injection molded glass fiber reinforced thermoplastic are in the electrical industry for the manufacture of switch gear insulated housing, switch components, motor housings and the like. Large housings used in luggage, business machines and refrigerators are also being made with increasing amounts of glass fiber reinforced thermoplastics.

While the aforementioned materials have been finding increasing use in industry, the most available and one of the least expensive of all general purpose thermoplastics, polyvinyl chloride (PVC), is only recently available commercially as a glass fiber reinforced compound. Polyvinyl chloride has not found greater utility in this field because of difficulties in injection molding glass fiber reinforced polyvinyl chloride. PVC has a relatively high viscosity, and flow is generally low. Fiber glass attrition is excessive because of the shear encountered when injection molding such high viscosity compounds. Unreinforced polyvinyl chloride plastic has found wide acceptancy in the manufacture of certain rigid structures by injection molding and compression molding, because of PVC's good rigidity, impact resistance, outdoor weather resistance and its self-extinguishing properties. One of the difficulties in successfully utilizing PVC in glass reinforced injection molding is in the high viscosity of the glass-resin compound and its lack of thermal stability. There has therefore been a necessity to provide a polyvinyl chloride composition which has a reduced viscosity for molding and which will effect better wet out of the glass fibers.

U.S. Pat. No. 2,773,851 issued Dec. 11, 1956, discloses blends of copolymers of vinyl resins and coumarone resins. U.S. Pat. No. 3,164,563 issued Jan. 5, 1965, discloses copolymers of thermoplastic resins having glass fibers incorporated therein. U.S. Pat. No. 2,572,798 issued Oct. 23, 1951, teaches that the addition of coumarone-indene resins to vinyl resins reduce the physical properties of the pure vinyl resin products disclosed therein.

However, it has been unexpectedly discovered that, contrary to the teachings of the prior art, vinyl chloride homopolymers mixed with certain critical amounts of coumarone-indene resin yield novel compositions which can be formed into articles which have higher strength than similar articles containing no coumarone-indene resin.

SUMMARY OF THE INVENTION

It is an object of this invention to provide a glass fiber reinforced polyvinyl chloride composition which has a low viscosity and subsequently a high dynamic thermal stability.

It is a further object of this invention to provide a glass fiber reinforced polyvinyl chloride composition which can be easily injection molded.

It is another object of this invention to provide a glass fiber reinforced thermoplastic composition which can be used to injection mold articles having high strength.

It is a further object of this invention to provide a glass fiber reinforced polyvinyl chloride composition which can be prepared using relatively inexpensive ingredients.

It is an important object of the present invention to provide a resin-glass fiber composition which has improved dynamic stability and which better wets out the glass fiber reinforcement during fabrication.

The foregoing objects and advantages are found in a thermoplastic composition including from about 50 to about 95 parts by weight of a vinyl chloride homopolymer and from about 50 to about 5 parts by weight of glass fibers. The polymer composition comprises about 100 parts by weight of the vinyl chloride homopolymer and about 8 to about 15 parts by weight of a coumarone-indene resin. The structure commonly assigned to such resins as as follows:

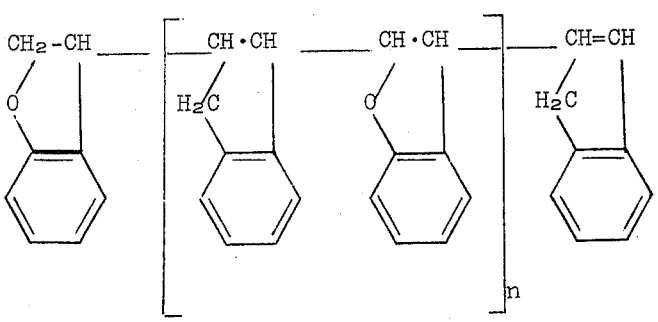

The composition is characterized by improved tensile strength, rigidity and heat deflection properties. It also has the ability to flow readily in injection molds having complex shapes and produces structural shapes having relatively smooth surface finishes.

DESCRIPTION OF THE PREFERRED EMBODIMENTS

The glass reinforced polyvinyl chloride composition of the present invention may be prepared from any suitable commercially available polyvinyl chloride homopolymers. For the most suitable injection molding components it is desirable to use moderately low molecular weight polyvinyl chloride homopolymers prepared by suspension process. One particularly suitable homopolymer of vinyl chloride that can be used in the compound of the present invention is one manufactured by Ethyl Corporation and designated SM-175. Such compound is a homopolymer of vinyl chloride having a bulk density of about 0.53 and a relative viscosity of about 1.75 $\pm$ .02 determined using 1 gram of resin per 100 grams of cyclohexyl and measuring the viscosity of 25°C.

The glass fiber used to prepare the composition of the invention may be any one of a number of commercially available multi-filament chopped fiberglass strands that are presently available. Such glass fibers are preferably given a coating using a coupling or bonding agent to assist joining of the polyvinyl chloride to the individual glass filaments. Any number of commercially available coupling agents may be utilized for treating the glass fibers employed in the compound of the present invention, particularly organosilane type coupling agents. Examples of suitable silanes are found in U.S. Pat. Nos. 2,563,288; 2,563,289; and 3,318,757. Werner complexes as disclosed in U.S. Pat. No. 2,552,910 may also be utilized as coupling agents. Many additional agents are listed in the paper entitled "The Influence of Reinforcements on Strength and Performance of Fiber Glass Reinforced Thermoplastics" by J. T. Inglehart et al, given at the 22nd meeting of Reinforced Plastics Division of the Society of Plastics Industry, Inc. (reprint available from Owens-Corning Fiber Glass Corp., Technical Center, Grandville, Ohio). It is preferred to utilize chopped multi-filament fiberglass strands having some twist therein. It is also preferred to use glass filaments provided with a sizing material which protects the individual filaments during handling and compounding as the glass fiber is worked into the vinyl chloride homopolymers. Chopped glass fibers having a strand length from ⅛ inch to 1 inch may be used to prepare compounds of the present invention. Strands having a length between ⅛ inch and ½ inch are preferred, however. The most desirable length for use in the present compounds are chopped strands of about ¼ inch length.

The coumarone-indene resin used in the compound of the present invention may be any one of a number of commercially available coumarone-indene resins. One of the preferred resins is Nevindene LX-509 available from Neville Chemical Company. Other suitable commercially available coumarone-indene resins are those known as R-1 Nevindene, R-3 Nevindene, R-5 Nevindene and R-6 Nevindene available from Neville Chemical Company. Some other suitable coumarone-indene resins are Cumar W and Cumar V resins made by Allied Chemical Company and Picoumarone resins 410, 410-L, 410-H, 410-HL, 410-EH, 410-EHL, 450-EH and 450-L made by Pennsylvania Industrial Chemical Company. Mixtures of any of the foregoing coumarone-indene resins may be used to prepare the polyvinyl chloride compounds of the present invention. It is preferred that such resins have a softening point (ring and ball test or ASTM-28-51T) of 100°C or higher. Those resins having a softening point between 126°C and 155°C are particularly preferred.

It is essential that the amount of coumarone-indene resin used relative to the amount of vinyl chloride resin be maintained within the following limits in order to obtain a composition which can be formed into articles having physical strengths higher than similar articles containing no coumarone-indene resin. The coumarone-indene resin in the compound of the present invention is present in an amount of from about 8 to about 15 parts by weight per 100 parts of vinyl chloride homopolymer. The most preferred amount of coumarone-indene resin is about 8 parts by weight per 100 parts of vinyl chloride homopolymer. Additionally, pigments, fillers, stabilizers, inhibitors, lubricants, and extrusion aids may be incorporated in the polyvinyl chloride composition of the present invention. The thermoplastic composition of the present invention may be prepared by any suitable process known in the art.

The compositions can also be prepared in situ, i.e., combined and mixed in the injection molding machine by providing suitable measuring and feeding equipment adjacent to the injection molding machine. The exemplary processes for mixing the glass fiber with the vinyl chloride homopolymer and other ingredients either in the injection molding machine or immediately prior thereto are set forth in Canadian Pat. Nos. 750,283 and 758,934. Any of the processes disclosed in the aforementioned patents may be successfully used to mix the ingredients used in the composition of the present invention.

A preferred process for producing the composition of the present invention as a preformed pellet which can subsequently be fed to the injection molding machine is disclosed in U.S. Pat. No. 3,164,563. In this patent, the chopped glass roving is fed to a single screw extruder together with polyvinyl chloride resin and the other conventional ingredients used to formulate the injection molding compound. The extrudate is chopped into suitable size pellets, such as ⅛ inch to ¼ inch in length, and packaged for subsequent use for feeding an injection molding apparatus.

It should be noted, however, that the present thermoplastic compositions can be readily prepared using a mixer such as a ribbon blender to make the preliminary mix and subsequently charging the mix to a FCM mixer. The compound can then be melt compounded, transferred to a roll mill and subsequently formed into molding pellets.

EXAMPLE A

The resin composition was prepared in accordance with the formulations shown in Table I hereinafter. This resin or PVC mix or compound was combined with various proportions of about ¼ inch long chopped fiberglass strands.

The process used in the preparation of the composition set out in Table I is as follows: The ingredients were weighed out and then charged to Henschel mixer and mixed for 3 minutes. The charge was then transferred to a Banbury mixer and mixed until the temperature rose to 350°F. In those samples containing glass fiber filaments, the glass filaments were added to the Banbury and allowed to disperse in the melt for about 1 minute and 15 seconds. The mix was discharged from the Banbury mixer at about 370°F. The mix was then placed on a roll mill for 340°F and milled for 1 minute. Stock was taken from the roll mill and diced into molding pellets and cooled to room temperature.

The molding pellets for each example were separately charged to a 10-ounce New Britain Ankerwerk injection molding apparatus where they were injection molded into statndard shapes for mechanical property testing. The injection molded samples were then removed and the mechanical properties were determined on these samples. Standard testing and/or necessary procedures were used. Heat distortion tests were performed in accordance with the procedures set forth in ASTM D6-48-(56-61), "Deflection Temperature of Plastics Under Load." The results are set forth in Table II hereinafter.

More preferred products formed from the compositions of the present invention have a flexural-elastic modulus of at least about 980,000 psi, or more preferably about 1,000,000 psi.

Even more preferred products formed from the compositions of the present invention have a heat distortion temperature at 264 psi of at least 80.0°C and a heat distortion temperature at 66 psi of at least 83.5°C, or more preferably at least about 84°C.

Additional preferred products formed from the compositions of the present invention have an Izod impact strength of at least about 0.78, or more preferably at least about 0.81.

Other preferred products formed from the compositions of the present invention have the following combination of properties:
Flexural strength of at least about 20,000 psi
Flexural-elastic modulus of at least about 980,000 psi
Izod Impact strength of at least about 0.78
Heat Distortion Temperatures - at 264 psi of at least Table I Resin Composition

| Formulation | Parts by Weight | | | | | |
|---|---|---|---|---|---|---|
| | 1 | 2 | 3 | 4 | 5 | 6 |
| PVC Homopolymer | 100 | 100 | 100 | 100 | 100 | 100 |
| Stabilizer I | 5 | 5 | 5 | 5 | 5 | 5 |
| Stabilizer II | 0.5 | 0.5 | 0.5 | 0.5 | 0.5 | 0.5 |
| Filler | 5 | 5 | 5 | 5 | 5 | 5 |
| Processing Aid | 3 | 3 | 3 | 3 | 3 | 3 |
| Internal Lubricant | 0.7 | 0.7 | 0.7 | 0.7 | 0.7 | 0.7 |
| Lubricant | 1.5 | 1.5 | 1.5 | 1.5 | 1.5 | 1.5 |
| Impact Modifier | — | — | — | 3 | 3 | — |
| Coumarone-Indene Resin | — | — | 8 | 8 | 6 | 8 |
| | Percent by Weight | | | | | |
| Resin Composition | 100 | 80 | 80 | 80 | 80 | 75 |
| Glass Fiber | 0 | 20 | 20 | 20 | 20 | 25 |

From the following table it can readily be seen that the polyvinyl chloride composition of the present invention possesses increased tensile yield, flexural strength, improved heat distortion temperature and ability to fill complex injection molds as evidenced by spiral flow, An increase of heat distortion temperature of 1°C is very important. Spiral flow is determined using an injection mold having a spiral flow path of ¼ inch in width and a depth of ⅛ inch. The longer the spiral flow the more readily the thermoplastic injection molding compound will completely fill a complex shaped injection mold.

about 80°C - at 66 psi of at least about 83.5°C

The most preferred products formed from the compositions of the present invention have the following combination of properties:
Flexural strength of at least about 21,000 psi
Flexural-elastic modulus of at least about 1,000,000 psi
Izod Impact strength of at least about 0.81
Heat Distortion Temperatures - at 264 psi of at least about 80°C - at 66 psi of at least about 83.5°C While it is not known precisely what physical or chemical part the coumarone-indene plays in the injec- Table II Properties of Resin Compositions of Table I

| Property | Units | Specimens | | | | | |
|---|---|---|---|---|---|---|---|
| | | 1 | 2 | 3 | 4 | 5 | 6 |
| Flexural Strength (ASTM D790) | psi | 12,197 | 17,750 | 21,598 | 20,865 | 21,109 | 22,455 |
| Flexural-Elastic Modulus (ASTM D790) | psi × 10³ | 427 | 967 | 1,018 | 987 | 982 | 1,155 |
| Izod Impact (ASTM D256) | | .76 | .65 | 0.78 | 0.86 | 0.88 | 0.81 |
| Heat Distortion Temp. at 264 psi | °C | 70.0 | 79.5 | 80.5 | 80.5 | 80.0 | 80.0 |
| Heat Distortion Temp. at 66 psi | °C | 78.0 | 83.0 | 84.0 | 84.5 | 83.5 | 84.0 |
| Spiral Flow (Injection molding) | Inches | 14.5 | 12.5 | 15.75 | 15.75 | 15.25 | 15.75 |

The products formed from the compositions of the present invention have a flexural strength of at least about 20,000 psi, or more preferably at least about 21,000 psi.

tion molding compounds of the present invention it is believed to function in a number of different ways. It appears to function as a processing aid for the PVC mix, that is, lowers the gelation temperature of the PVC mix. It is also believed to function as an internal lubricant to reduce the viscosity of the PVC mix and reduce or inhibit attrition of the fiber glass filaments during fabrication. It also serves to increase the dynamic stability of the resulting compound. Dynamic stability is the length of time a given compound will remain in a thermally stable condition or undergoing shear at temperatures in the range necessary for processing or fabricating the compound.

Articles may be formed from the compositions of the present invention by any of the methods well known in the art, such as injection molding, compression molding, blow molding, thermo-forming, vacuum molding, and the like.

The foregoing disclosure and description of the invention is illustrative and explanatory thereof and various changes may be made within the scope of the claims without departing from the spirit of the invention.

What is claimed is:

1. A rigid thermoplastic composition consisting essentially of a resin composition comprising about 100 parts by weight of a rigid vinyl chloride homopolymer, about 8 to about 15 parts by weight of a coumarone-indene resin having a ring and ball softening point above about 100°C, and about 5 percent to about 55 percent glass fibers by weight of resin composition.

2. The composition of claim 1 wherein said coumarone-indene resin has a ball and ring softening point between about 126°C and about 155°C.

3. The composition of claim 1 wherein said glass fibers are from about ⅛ inch to about 1 inch in length.

4. The composition of claim 1 wherein said glass fibers are about ¼ inch in length.

5. The composition of claim 1 wherein said vinyl chloride homopolymer has a bulk density of about 0.53 and a relative viscosity of about 1.75 ± 0.2 determined using 1 gram of resin per 100 grams of cyclohexyl and measuring the viscosity at 25°C.

6. A product formed from the composition of claim 1, wherein said product has a flexural strength of at least about 20,000 psi.

7. A product formed from the composition of claim 1, wherein said product has a flexural-elastic modulus of at least about 980,000 psi.

8. A product formed from the composition of claim 1, wherein said product has a heat distortion temperature at 264 psi of at least about 80°C and a heat distortion temperature at 66 psi of at least about 83.5°C.

9. A product formed from the composition of claim 1, wherein said product has an Izod impact strength of at least about 0.78.

10. The product formed from the composition of claim 1, wherein said product has a flexural strength of at least about 20,000 psi, a flexural-elastic modulus of at least about 980,000 psi, an Izod impact strength of at least about 0.78, a heat distortion temperature at 264 psi of at least about 80°C, and a heat distortion temperature at 66 psi of at least about 83.5°C.

* * * * *